Nov. 20, 1962    R. A. O. HALLBERG    3,064,948
SEED TREATING APPARATUS
Filed Feb. 6, 1961    2 Sheets-Sheet 1
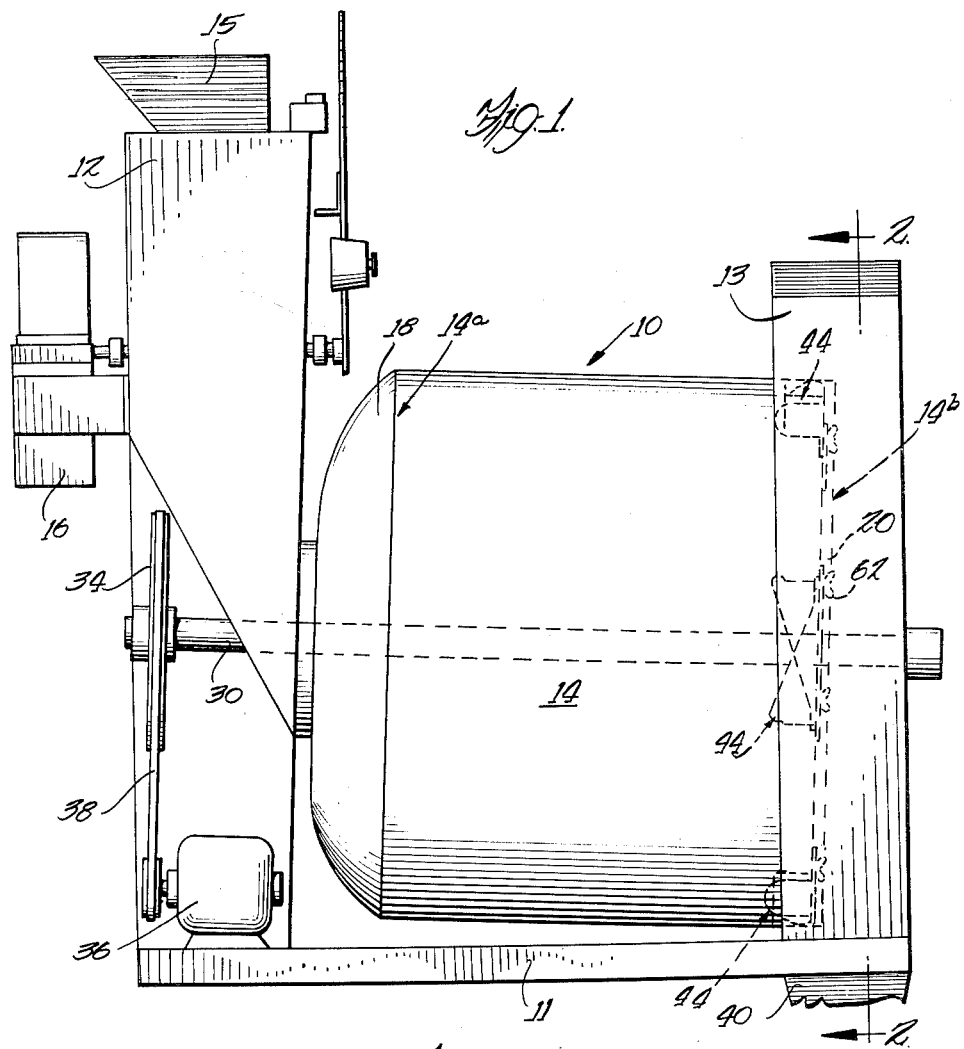
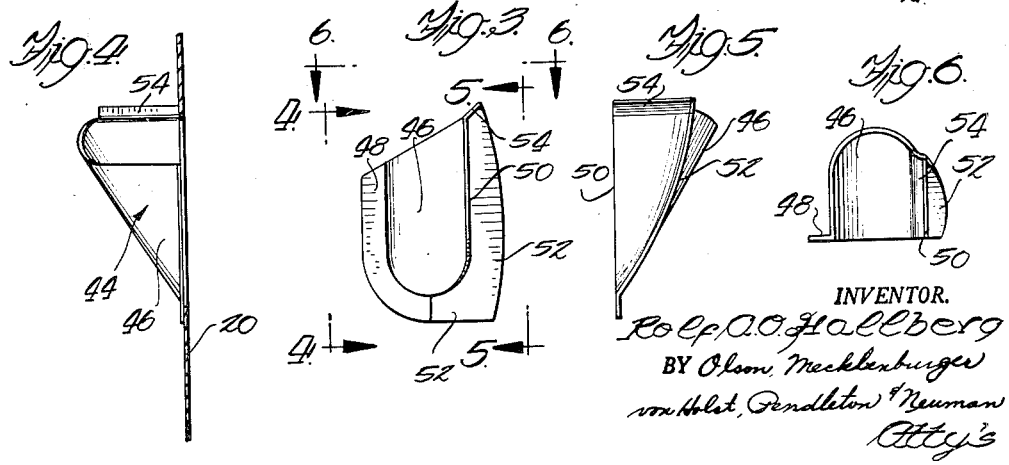
INVENTOR.
Rolf A. O. Hallberg
BY Olson, Mecklenburger,
von Holst, Pendleton & Neuman
Atty's

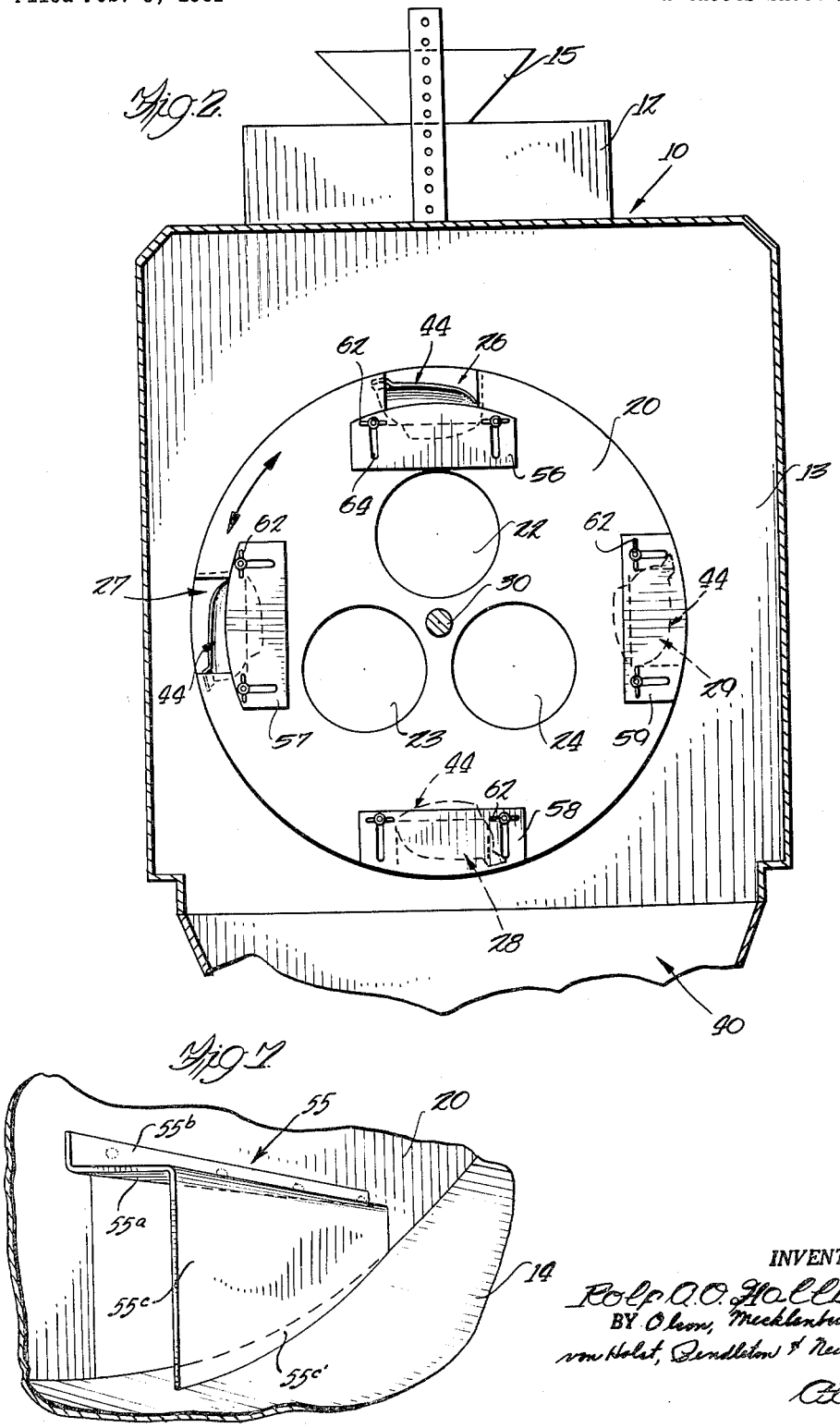

3,064,948
SEED TREATING APPARATUS
Rolf A. O. Hallberg, Vallingby, Stockholm, Sweden, assignor, by mesne assignments, to Morton Salt Company, Chicago, Ill., a corporation of Delaware
Filed Feb. 6, 1961, Ser. No. 87,347
7 Claims. (Cl. 259—3)

This invention relates to seed treating apparatus, and more particularly, to an improvement in apparatus for continuously coating seeds with a liquid disinfectant.

Seed treating apparatus is employed to coat seed with a disinfectant in order to protect the seed from decay and from blights and diseases which may be caused by organisms carried on the seed and in the soil.

In one particularly successful design of seed treating apparatus, a rotating drum is employed to achieve the desired degree of intermixing between the seeds and the liquid disinfectant. The drum is disposed at a slight angle with the horizontal, such that one end thereof is slightly higher than the other. Seed and liquid disinfectant are charged into the elevated end of the drum, preferably through a central opening in the end wall of the drum, and the rotation of the drum causes the seed and disinfectant to be thoroughly intermixed, as they move toward the lower end of the drum. If desired, several baffles may be provided within the drum to increase the degree of agitation and intermixing therein. The treated or coated seed is discharged through a central opening in the panel at the lower end of the drum. Since this panel is centrally apertured, seed can only leave the drum when enough has accumulated within the drum to overflow this central aperture. While this results in a very efficient treating operation and increased capacity of the treater, it is evident that a substantial amount of seed will remain in the drum at the end of the treatment. Emptying of the drum by hand, as was previously practiced, is obviously not a very satisfactory arrangement.

It is one object of this invention to construct a rotating drum treater in such a manner that the drum can be completely emptied very quickly at the end of the treatment period.

It is another object of this invention to provide a device which will effect the agitation of the seed and liquid disinfectant within the drum during the treatment of the seed and will facilitate the rapid emptying of the drum at the end of the treatment period.

It is a further object of this invention to provide an improvement in drum-type seed treating apparatus which will permit the efficient emptying of the drum automatically at the end of the seed treatment period but will prevent the premature discharge of the seed.

It is an additional object of this invention to provide an inexpensive yet important improvement in a seed treating apparatus which will facilitate the complete emptying of the drum so that no seed or disinfectant will remain therein to necessitate emptying of the drum by hand.

Other objects will be seen, and a fuller understanding of the invention may be had by referring to the following description and claims taken in conjunction with the accompanying drawings.

In accordance with this invention an improved seed treating apparatus is provided. This apparatus includes a substantially horizontally disposed, axially rotatable drum for holding and intermixing a quantity of seeds and a quantity of liquid seed treating material. The drum has an apertured forward end through which untreated seeds and the seed treating material may be charged; and fixed at the opposite end of the drum is an interiorly apertured panel through which the treated seeds may be discharged. The panel, in addition to its interior aperture, has a plurality of peripheral openings. Several scoops are mounted within the drum, each scoop being opened toward one side only and being fixed in position with respect to the panel such that it covers one of the peripheral openings therein.

Means is provided for effecting rotation of the drum about its axis, selectively in opposite directions. The scoops when rotated in the direction wherein the open sides thereof are trailing are effective to deflect the seeds away from the peripheral panel openings covered thereby and to thus prevent the seeds in the drum from being prematurely discharged through these openings. However, when the drum is rotated in the opposite direction, the open sides of the scoops are leading, and the scoops are effective to capture the seeds within the drum and direct them out through the associated peripheral openings in the end panel. Thus, the drum may be completely emptied of seeds, and there is no need to resort to hand-emptying operations. External closures may be provided for the peripheral openings in the panel to prevent premature discharge of the seed in the event the rotation of the drum is stopped during the treating period.

One of the important features of this invention is the novel design of the scoops which permits them to aid in the agitation of the materials during the seed treatment period and to subsequently facilitate the automatic emptying of the mixing drum. Each of the scoops is preferably provided with a deflector plate which permits the scoop to effect agitation of the seed within the drum, while at the same time preventing the seed from wedging between the scoop and the side of the drum.

With reference to the drawings:

FIGURE 1 is a side elevation view of an apparatus constructed in accordance with this invention;

FIG. 2 is an end elevation view of the apparatus illustrated in FIG. 1 showing the panel at the discharge end of the treater drum;

FIG. 3 is an end view of one of the scoops;

FIG. 4 is a side elevation view of one of the scoops taken substantially along line 4—4 of FIG. 3 and illustrating the way in which the scoop may be mounted on the panel at the discharge end of the drum;

FIG. 5 is a view of the opposite side of the scoop taken substantially along line 5—5 of FIG. 3;

FIG. 6 is a top plan view of the scoop taken substantially along line 6—6 of FIG. 3; and FIG. 7 is a perspective view of a slightly modified scoop.

With more particular reference to the drawings, the apparatus 10 illustrated in FIGS. 1 and 2 is adapted to intermix seed and liquid disinfectant with the result of coating the seed with the disinfectant. The apparatus includes a frame 11, an inlet housing 12 at one end of the frame, an outlet housing 13 at the opposite end of the frame, and a substantially horizontally disposed drum 14 mounted for axial rotation between the housings 12 and 13. A seed hopper 15 and a disinfectant receptacle 16 are mounted on the inlet housing 12. The seed and the liquid disinfectant are adapted to be delivered by suitable means from the hopper 15 and the receptacle 16, respectively, through the housing 12 and into the drum 14. Various metering and proportioning devices are also employed to achieve charging of proper amounts of these materials into the drum. Since, however, these devices are not part of this invention, they are not shown or described herein.

The drum 14 is substantially cylindrical and the forward end 14a thereof is closed by an end wall 18 which has a central aperture through which the disinfectant material and seed may be charged. At the opposite end 14b of the drum is a panel 20 which is also interiorly apertured. This panel, as best illustrated in FIG. 2, has three unconnected interior apertures 22, 23, and 24, which are closely and uniformly spaced about the center of the panel and thus function as a single large central aperture. The panel 20 also has several peripheral openings therein. In the illustrated embodiment there are four such openings 26, 27, 28, and 29.

The drum 14 is mounted on a shaft 30 which is journalled in fixtures mounted at opposite ends of the frame 11, and the forward end 14a of the drum is preferably slightly elevated with respect to the discharge end 14b of the drum to facilitate movement of the materials through the drum. Means is provided for effecting rotation of the drum 14.

In the preferred and illustrated embodiment, a wheel 34 fixed to the shaft 30 is driven by a motor 36 through a belt 38 to thereby effect axial rotation of the shaft 30 and of the drum 14. The motor 36 is reversible such that the drum 14 may be rotated selectively in opposite directions. There are, of course, many other ways of interconnecting the motor 36 to the drum to effect the desired rotation of the drum. It is important, however, to either have a reversible motor 36 or to provide some means for reversing the direction of the application of driving force to the drum.

The discharge end 14b of the drum is disposed within the outlet housing 13, and the housing 13 is in communication with a discharge spout 40, such that seed discharged from the drum into the housing 13 is conducted through the spout 40 and discharged from the apparatus.

Mounted internally of the drum and covering each of the peripheral openings in the panel 20 are several metal scoops 44. There are preferably four such scoops; and each covers one of the peripheral openings in the panel 20. The preferred construction of the scoop is illustrated in FIGS. 2 through 6. Each scoop has a gradually distended pocketlike body portion 46 of substantially U-shaped cross section which extends obliquely inward and laterally across the corresponding peripheral opening in the panel 20. Each scoop is thus open inwardly toward one side. At the top of the body portion 46 is a planar, panel-engaging flange 48, and the bottom edge 50 of the body portion terminates in the plane of this flange 48, so that the scoop may rest firmly against the panel 20. Each scoop is fixed in position over one of the peripheral openings in the panel 20 with the top flange 48 disposed toward the center of the panel, and with this flange and the bottom edge 50 of the body portion resting flatly against the interior surface of the panel. The scoop, thus, provides a tangential duct between the peripheral opening in the panel 20 and the interior of the drum 14.

With this scoop design a deflector plate 52 is employed advantageously. The deflector plate 52 is connected to the body portion 46 of the scoop and extends radially therefrom into contact with the interior side surface of the drum 14 to prevent seed from being wedged between the scoop body portion 46 and the drum. The deflector plate 52 extends along the length of the scoop body portion 46 and is disposed at substantially the same oblique angle with respect to the panel 20 as the interior of the scoop body portion. Adjacent the tangential opening in the scoop body a lateral edge 54 of the body portion is flared radially outward into engagement with the interior side surface of the drum. This flared edge 54 and the deflector plate 52 insure that no seed will be permitted to lodge between the scoop and the drum regardless of the direction of rotation of the drum.

In FIG. 7 there is illustrated a slightly modified scoop 55 which is somewhat easier to construct and eliminates the deflector plate 52. This scoop consists of a triangular top plate 55a having an upturned flange 55b, and an interior plate 55c which extends from the top plate 55a into engagement with the surface of the drum 14. The edge 55c' of the plate 55c is curved to fit the curvature of the drum 14; and it may be welded to the drum if desired. The flange 55b is welded or otherwise fastened interiorly of, i.e., above, the opening covered by the scoop. This scoop is thus also open laterally, tapered and provides a tangential duct between the peripheral opening in the panel and the interior of the drum 14.

Mounted on the exterior of the panel 20 are four closure members 56, 57, 58, and 59. These closure members are each adjustably positioned by means of a pair of threaded fasteners 62 which extend through parallel slots 64 in each of the closures. These closures are thus independently operable and serve to prevent seeds from discharging prematurely through the peripheral openings 26, 27, 28, and 29, should the drum be stopped during the treatment period.

In operation, the motor 36 is energized to effect rotation of the drum 14 first in the clockwise direction, as viewed in FIG. 2. Seeds are charged into the hopper 15, and liquid disinfectant is charged into the receptacle 11; and these two materials are properly metered and fed into the drum 14 through the central opening in the forward end 14a thereof. The seeds and liquid disinfectant are thoroughly intermixed by the rotation of the drum as they move toward the panel 20 at the lower or discharge end 14b of the drum. When the treated seeds have accumulated in the rotating drum 14 to the level of the interior apertures 22, 23, and 24 in the panel 20, these seeds will flow through these apertures into the outlet housing 13 and thence through the discharge spout 40. This operation is continued until all of the seeds have been charged into the hopper 15 and have been transferred to the drum 14. When the charging of the drum ceases, the discharge of the drum, of course, also ceases, for the level of the seeds no longer continues to rise above the level of the path of the three central apertures in the panel 20. At this point, the motor 36 should be stopped, and the closures 56, 57, 58, and 59 should be opened, if they have been previously closed. The motor 36 may then be actuated to effect rotation of the drum 14 in the opposite or counterclockwise direction, as illustrated in FIG. 2.

It will be noted that as the drum rotates in the clockwise direction during the treatment of the seeds, the interior opening in each of the scoops 44 is trailing; that is, the direction of the tangential openings in the scoops and the direction of rotation of the scoops are opposite. As the scoops are rotated in this direction into contact with the seeds in the drum, the oblique scoop body portion 46 and the deflector plate 52 force the seed away from the associated peripheral opening and thereby effect agitation of the seed at the discharge end 14b of the drum. None of the seeds can, therefore, be discharged from the rotating drum prematurely during the seed treating operation even if the exterior closures 56, 57, 58, and 59, for the peripheral openings were left open. Of course, if for some reason the drum was brought to a stop during the treating period, it could be possible for some seed to be discharged through the peripheral openings in the panel 20 if it were not for the closures 56, 57, 58, and 59.

When all of the seeds and disinfectant have been fed into the drum, the discharge of treated seeds into the housing 40 will cease, because the level of the seeds will no longer be caused to rise above the level of the central apertures in the panel 20. It is at this point that the scoops 44 are ready to perform their principal function. The drive motor 36 is reversed, and the drum is rotated in the opposite or counterclockwise direction, as viewed in FIG. 2. As the drum 14 is rotated in this direction, the distended tangential openings in the scoops are caused to lead; that is, the direction of the scoop openings and the direction of drum rotation are the same. The tangentially open portions of these scoops thus actually rotate into and serve to collect the seed from within the drum 14 and to direct it through the peripheral openings in the panel 20. The oblique inward extension and gradual distension of the scoop body 48 cause the seeds to be smoothly directed from the drum. The rotation of the drum in this counterclockwise direction is continued until all of the seeds have been collected by the scoops 44 and have been directed from the drum.

With this invention, it is apparent that manual emptying of the drum after the treatment period is eliminated. All of the seeds which are charged into the apparatus are coated and automatically discharged from the apparatus. Thus, the operation of the machine is very efficient.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, said panel having a plurality of peripheral openings therein, a plurality of internally disposed scoops, each scoop being open toward one side only and fixed in position with respect to said panel to cover one of the peripheral openings therein, and means for effecting rotation of said drum selectively in opposite directions, said scoops when rotating with said drum and said panel in the direction wherein the open side thereof is trailing being effective to prevent the seeds in said drum from being discharged from said peripheral openings, and when moving with said drum and said panel in the opposite direction wherein the open side thereof is leading being effective to capture the seeds and direct them out through the associated opening.

2. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, said panel having a plurality of peripheral openings and an externally disposed closure for each opening; a plurality of internally disposed scoops, each scoop being open toward one side only and fixed in position with respect to said panel to cover one of the peripheral openings therein, and reversible drive means for effecting rotation of said drum selectively in opposite directions, said scoops when moving with said drum in the direction wherein the open side thereof is trailing being effective to prevent the seeds in said drum from being directed toward said peripheral openings, and when moving with said drum in the opposite direction wherein the open side thereof is leading being effective to capture the seeds and direct them toward the associated opening and through said opening when the closure therefore is open, whereby said drum may be quickly emptied.

3. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, and means for effecting rotation of said drum selectively in opposite directions, said panel having a plurality of peripheral openings therein and an individually operable externally disposed closure for each opening and a plurality of internally disposed scoops tangentially open on one side only, each scoop being fixed in position with respect to said panel to cover one of said openings, said scoops when rotating with said drum and said panel in the direction wherein the open side thereof is trailing being effective to prevent the seed from being prematurely discharged from said peripheral openings, and when moving with said drum and said panel in the opposite direction wherein the open side thereof is leading being effective to capture the seeds and direct them out through the associated opening when the closure thereof is open, whereby said drum may be quickly emptied.

4. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, said panel having a plurality of peripheral openings therein and an externally disposed closure for each opening, and a plurality of internally disposed scoops gradually distended to provide an enlarged tangential opening at one side, each scoop being fixed in position with respect to said panel to cover one of said openings, said scoops when rotating with said drum and said panel in the direction wherein the open side thereof is trailing being effective to agitate the seeds in said drum and to prevent the seed from being prematurely discharged from said peripheral openings, and when moving with said drum and said panel in the opposite direction wherein the open side thereof is leading being effective to capture the needs and direct them out through the associated opening, when the closure thereof is open, whereby said drum may be quickly emptied.

5. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, said panel having a plurality of peripheral openings therein and an externally disposed closure for each opening; and a plurality of transverse, internally disposed scoops, each scoop having a body of substantially U-shaped cross section gradually distended to provide an enlarged tangential opening at one side and fixed in position with respect to said panel to cover one of said openings, said scoops when being rotated with said drum and said panel in the direction wherein the open side thereof is trailing being effective to agitate the seeds in said drum and to prevent the seed from being prematurely discharged from said peripheral openings, and when moving with said drum and said panel in the opposite direction wherein the open side thereof is leading being effective to capture the seeds and direct them out through the associated opening when the closure thereof is open, whereby said drum may be quickly emptied.

6. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, and means for effecting rotation of said drum selectively in opposite directions; said panel having a plurality of peripheral openings therein and a plurality of internally disposed scoops, each scoop being open toward one side only and fixed in position with respect to said panel to cover one of the peripheral openings therein, each scoop having a radial deflector plate disposed angularly with respect to said panel and extending between approximately the innermost portions of the scoop body and the drum, said scoops when rotating with said drum and said panel in the direction wherein the open side thereof is trailing being effective to agitate the seeds and to prevent the seeds in said drum from being discharged from said peripheral openings, and when moving with said drum and said panel in the opposite direction, wherein the open side thereof is leading being effective to capture the seeds and direct them out through the associated opening.

7. In an apparatus for treating seeds, an axially rotatable drum for holding and intermixing a quantity of seeds and a quantity of liquid seed treating material, said drum having a forward end through which untreated seeds may be charged and having an interiorly apertured panel fixed at its opposite end through which treated seeds may be discharged, said panel having a plurality of peripheral openings therein and an externally disposed closure for each opening, and a plurality of transverse, internally disposed scoops, each scoop having a body of substantially U-shaped cross section gradually distended to provide an enlarged tangential opening at one side and fixed in position with respect to said panel to cover one of said openings, each scoop having a radial deflector plate disposed along the length of the scoop body and extending between approximately the innermost portions of the scoop body and the drum, whereby seeds are prevented from being jammed between the scoop body and the drum, said scoops when being rotated with said drum and said panel in the direction wherein the open side thereof is trailing being effective to agitate the seeds in said drum and to prevent the seeds from being prematurely discharged from said peripheral openings, and when moving with said drum and said panel in the opposite direction wherein the open side thereof is leading being effective to capture the seeds and direct them out through the associated opening when the closure thereof is open, whereby said drum may be quickly emptied.

References Cited in the file of this patent
UNITED STATES PATENTS 1,498,379    John _____ June 17, 1924